(12) United States Patent
Kim

(10) Patent No.: US 9,364,759 B2
(45) Date of Patent: *Jun. 14, 2016

(54) METHOD FOR PROVIDING ON-LINE GAME WHICH SYSTEMATICALLY MAINTAINS MONSTER'S AGGRO POINTS AGAINST PLAYER CHARACTER AND SYSTEM THEREOF

(71) Applicant: NHN Entertainment Corporation, Seongnam-si (KR)

(72) Inventor: Dong Eun Kim, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,967

(22) Filed: Jun. 4, 2014

(65) Prior Publication Data
US 2014/0287817 A1    Sep. 25, 2014

Related U.S. Application Data

(63) Continuation of application No. 11/571,742, filed as application No. PCT/KR2005/002251 on Jul. 13, 2005, now Pat. No. 8,771,075.

(30) Foreign Application Priority Data

Jul. 14, 2004    (KR) .................. 10-2004-0054651

(51) Int. Cl.
*A63F 13/00*    (2014.01)
*A63F 13/56*    (2014.01)
(Continued)

(52) U.S. Cl.
CPC ............. *A63F 13/56* (2014.09); *A63F 13/12* (2013.01); *A63F 13/45* (2014.09); *G07F 17/32* (2013.01); *G07F 17/3232* (2013.01)

(58) Field of Classification Search
CPC ..... A63F 2300/807; A63F 13/45; A63F 13/56
USPC .......................................................... 463/42
See application file for complete search history.

(56) References Cited

U.S. PATENT DOCUMENTS 6,251,010 B1    6/2001    Tajiri et al.
6,679,774 B2    1/2004    Fujioka et al.

FOREIGN PATENT DOCUMENTS

JP    13-129255    5/2001
JP    13-252472    9/2001
(Continued)

OTHER PUBLICATIONS

Gravity Co., Ltd., "Ragnarok Open Casino Comodo", Newspaper of Gamechosun, Jan. 14, 2003, 2 pages, Korea.
(Continued)

*Primary Examiner* — Milap Shah
*Assistant Examiner* — Thomas H Henry
(74) *Attorney, Agent, or Firm* — H.C. Park & Associates, PLC

(57) ABSTRACT

Disclosed is a method for providing an online game, comprising the steps of: maintaining an event database recording an aggressive point generation function corresponding to each predetermined event; receiving a particular event from a player character; identifying an aggressive point generation function corresponding to the particular event by referring to the event database; generating aggressive point information according to receipt of the particular event, on the basis of the identified aggressive point generation function; recording the generated aggressive point information in a predetermined monster information database in association with the player character; and determining a target for attack of a monster on the basis of the aggressive point information recorded in the monster information database, and a system thereof.

13 Claims, 6 Drawing Sheets

| MONSTER IDENTIFIER | PLAYER CHARACTER | CHANNEL | AGGRESSIVE POINT FOR EACH CHANNEL | AGGRESSIVE POINT INFORMATION |
|---|---|---|---|---|
| M_id 0001 | suezo | First Channel | 50 | 175 |
| | | Second Channel | 25 | |
| | | Third Channel | 100 | |
| | windy | First Channel | 60 | 105 |
| | | Second Channel | 30 | |
| | | Third Channel | 15 | |
| | ---- | ---- | ---- | ---- |
| M_id 0002 | karma | First Channel | 90 | 300 |
| | | Second Channel | 200 | |
| | | Third Channel | 10 | |
| | cluster | First Channel | 10 | 55 |
| | | Second Channel | 30 | |
| | | Third Channel | 15 | |
| | ---- | ---- | ---- | ---- |

-----

(51) Int. Cl.
*A63F 13/45* (2014.01)
*G07F 17/32* (2006.01)
*A63F 13/30* (2014.01)

(56) References Cited

FOREIGN PATENT DOCUMENTS

| | | |
|---|---|---|
| JP | 14-239239 | 8/2002 |
| JP | 14-331170 | 11/2002 |
| JP | 15-225463 | 8/2003 |
| JP | 16-105444 | 4/2004 |

OTHER PUBLICATIONS

Gthtech Co., Ltd., "Gate of Heaven Add Birdie Registration System and Mop-Mo-Ri Prevention System", Newspaper of Gamechosun, Mar. 21, 2004, 2 pages, Korea.

Tantra, "Are Monsters of "Tantra" Insane?", Newspaper of Ilgansport, Feb. 12, 2004, 3 pages, Korea.

Allakhazam, "Basic Concepts", retrieved on Apr. 10, 2003 from Allakhazam.com:Everquest Online Adventures.

Non-Final Office Action dated Jun. 28, 2010 in U.S. Appl. No. 11/571,742.

Final Office Action dated Dec. 15, 2010 in U.S. Appl. No. 11/571,742.

Non-Final Office Action dated Apr. 4, 2011 in U.S. Appl. No. 11/571,742.

Final Office Action dated Sep. 15, 2011 in U.S. Appl. No. 11/571,742.

Pre-Brief Appeal Conference Decision dated Feb. 15, 2012 in U.S. Appl. No. 11/571,742.

Notice of Allowance dated Mar. 4, 2014 in U.S. Appl. No. 11/571,742.

International Search Report dated Oct. 25, 2005 in international Application No. PCT/KR2005/002251.

FIG. 3

| EVENT | EVENT IDENTIFIER(301) | AGGRESSIVE POINT GENERATION FUNCTION | CHANNEL |
|---|---|---|---|
| Attack trial | P2M_TryDamage | Function A | First Channel |
| Attack success | P2M_Damage | Function B | Third Channel |
| Debuff trial | P2M_TryDebuff | Function C | First Channel |
| Debuff success | P2M_Debuff | Function D | Third Channel |
| Heal | P2P_Heal | Function E | Second Channel |
| Buff | P2P_Buff | Function F | Second Channel |
| ---- | -------- | --------- | ---- |

| MONSTER IDENTIFIER | PLAYER CHARACTER | CHANNEL | AGGRESSIVE POINT FOR EACH CHANNEL | AGGRESSIVE POINT INFORMATION |
|---|---|---|---|---|
| M_id 0001 | suezo | First Channel | 50 | 175 |
| | | Second Channel | 25 | |
| | | Third Channel | 100 | |
| | windy | First Channel | 60 | 105 |
| | | Second Channel | 30 | |
| | | Third Channel | 15 | |
| | ---- | ---- | ---- | ---- |
| M_id 0002 | karma | First Channel | 90 | 300 |
| | | Second Channel | 200 | |
| | | Third Channel | 10 | |
| | cluster | First Channel | 10 | 55 |
| | | Second Channel | 30 | |
| | | Third Channel | 15 | |
| | ---- | ---- | ---- | ---- |
| ---- | | | | |

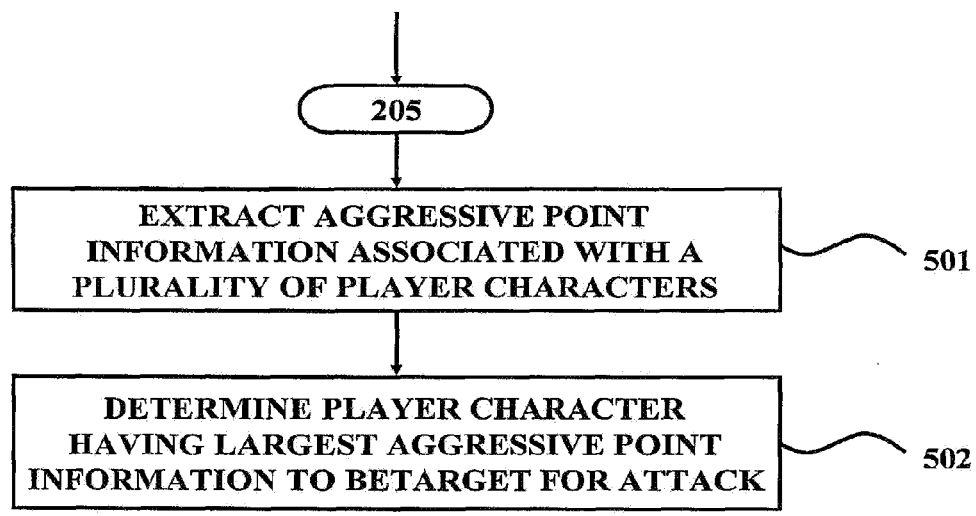
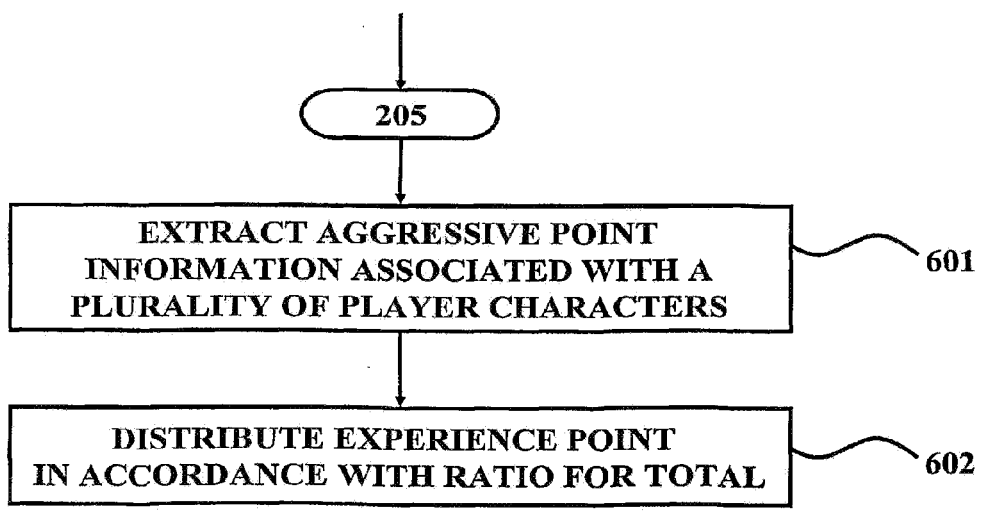

METHOD FOR PROVIDING ON-LINE GAME WHICH SYSTEMATICALLY MAINTAINS MONSTER'S AGGRO POINTS AGAINST PLAYER CHARACTER AND SYSTEM THEREOF

CROSS REFERENCE TO RELATED APPLICATIONS

This application is a continuation of U.S. patent application Ser. No. 11/571,742, filed on Jan. 5, 2007, which is the U.S. National Stage Entry of International Application No. PCT/KR2005/002251, filed on Jul. 13, 2005, and claims the benefit of and priority from Korean Patent Application No. 10-2004-0054651, filed on Jul. 14, 2004. The disclosures of International Application No. PCT/KR2005/002251 and Korean Patent Application No. 10-2004-0054651 are fully incorporated herein by reference.

TECHNICAL FIELD

The present invention relates to method and system for providing an online game, and more particularly, to method and system which systematically maintain aggressive point information on a player character of a monster, and select a target for attack of the monster on the basis of the aggressive point information or distribute an experience point associated with the monster to a plurality of player characters.

BACKGROUND ART

An RPG (Role Playing Game) is a game in which a plurality of player characters meets with a monster as an example of various NPC (Non Player Characters) during a process for performing a particular quest, and obtains an item belonging to the monster, or increases its ability through a match with the monster, thereby performing the quest, while continuing a game together.

In this RPG, if a player character gives an attack to a monster, the monster reacts to the player character who has given the attack. At this time, in conventional online game providing method and system, to which player character a monster reacts first when a plurality of player characters attacks the monster, and the standard thereof are not clearly defined. Thus, since a monster reacts only to a player character that has performed an initial attack to the monster itself or the monster reacts without a regular rule whenever various player characters attack the monster itself gamers' fun obtained through a game is reduced by half.

Also, in the conventional online game providing method and system such above, since a monster reacts only to a player character that has performed an initial attack, a "roundup of mobs", that is, a particular expedient of an online RPG, was very popular among gamers.

The "roundup of mobs" is that one player character mobs and hunts down a plurality of monsters. In an online game according to the prior art, since monsters are densely distributed in a particular area where the roundup of mobs is advantageous, the systematic balance of a game collapses and gainers not using the roundup of mobs are lack of monsters to hunt down. However, the conventional online game providing method and system are not provided with appropriate apparatus capable of controlling the roundup of mobs.

Meanwhile, since the problems as described above reduce gamers' participation desire for a game, consequently profits of an online game company do not increase.

Accordingly, there is required the appearance of new technology which can enhance interests of gamers by considerably preventing the so-called roundup of mobs that one player character mobs and hunts down a plurality of monsters in a game and delicately adjusting various elements associated with the progress of the game.

DISCLOSURE OF INVENTION

Technical Goals

The present invention is conceived to solve the aforementioned problems in the prior art. Thus, the present invention provides method and system for providing an online game, which can prevent a roundup of mobs by systematically maintaining aggressive point information with respect to a player character of a monster and selecting a target for attack of the monster on the basis of the aggressive point information.

The present invention also provides method and system for providing an online game, which distribute experience points reasonably enough to satisfy gamers by systematically using aggressive point information with respect to a player character of a monster and fairly distributing experience points associated with the monster to a plurality of player characters on the basis of the aggressive point information.

The present invention also provides method and system for providing an online game, which solve complications between gamers about possession of a drop item and remove gamers' distrusts about a game company by systematically using aggressive point information with respect to a player character of a monster and having a particular player character possess a drop item associated with the monster on the basis of the aggressive point information.

The present invention also provides method and system for providing an online game, which improve gamers' fan about a game by diversifying elements involved in generation of aggressive point information and influence according to each element.

The present invention also provides method and system for providing an online game, which can enhance interests of a game through maintenance of more systematic aggressive point information by dividing the aggressive point information into various types and making disappearance of aggressive point information and a decrease rate thereof differential in accordance with each type.

Technical Solutions

In order to achieve the above goals and solve the aforementioned problems in the prior art, there is provided a method for providing an online game according to an embodiment of the present invention, the method including the steps of maintaining an event database recording an aggressive point generation function corresponding to each predetermined event; receiving a particular event from a player character; identifying an aggressive point generation function corresponding to the particular event by referring to the event database; generating aggressive point information according to receipt of the particular event, on the basis of the identified aggressive point generation function; recording the generated aggressive point information in a predetermined monster information database in association with the player character; and determining a target for attack of a monster on the basis of the aggressive point information recorded in the monster information database.

According to an aspect of the present invention, there is provided a method for providing an online game, in which the monster information database comprises a first, a second, and a third channels, a first, a second, and a third aggressive points are recorded in the first, the second, and the third channels, respectively, each of the events is associated with at least one channel of the first, the second, and the third channels, and the aggressive point information is the total of the first, the second, and the third aggressive points.

According to another aspect of the present invention, there is provided a method for providing an online game, in which the first aggressive point decreases in accordance with a first decreasing function of time, the second aggressive point decreases in accordance with a second decreasing function of time, the third aggressive point is maintained to be regular, and a decrease rate of the first decreasing function is larger than that of the second decreasing function.

Also, there is provided a system for providing an online game according to an embodiment of the present invention, the system including: an event database including an aggressive point generation function corresponding to each predetermined event; a user event input unit receiving a particular event from a player character; an aggressive point information generation unit identifying an aggressive point generation function corresponding to the particular event by referring to the event database, and generating aggressive point information according to receipt of the particular event on the basis of the identified aggressive point generation function; a monster information database recording the generated aggressive point information in association with the player character; and an attack target determination unit determining a target for attack of a monster on the basis of the aggressive point information recorded in the monster information database.

An online game providing system described as an illustrative example in the present specification is an online-based game, and particularly, an online RPG (Role Playing Game) in which the exchange of game items is very active. This is for convenience of description. Only, it will be apparent to those of ordinary skills in the related art that the technical spirits of the present invention may be applied to not only an online-based game, but also a personal computer-based game or a video console-based game.

Also, a monster continuously used in the present specification indicates an NPC (Non-Player Character) that acts as an aggressive character against a player character in an online game, and a player character continuing a game indicates an object that obtains an item belonging to a monster by attacking the monster or improves its ability, thereby performing a quest, that is, that operates in correspondence with control of a game user.

BRIEF DESCRIPTION OF DRAWINGS

FIG. 3 is a view illustrating an example of an event database, in an embodiment of the present invention;

FIG. 4 is a view illustrating an example of a monster information database, in an embodiment of the present invention;

FIG. 5 is a flowchart illustrating the process of determining a target for attack of a monster on the basis of aggressive point information, in an embodiment of the present invention;

FIG. 6 is a flowchart illustrating the process of distributing experience points associated with a monster to a plurality of player characters on the basis of aggressive point information, in another embodiment of the present invention;

DETAILED DESCRIPTION

Hereinafter, online game providing method and system according to the present invention will be in detail described with reference to the accompanying drawings.

Figure 1:
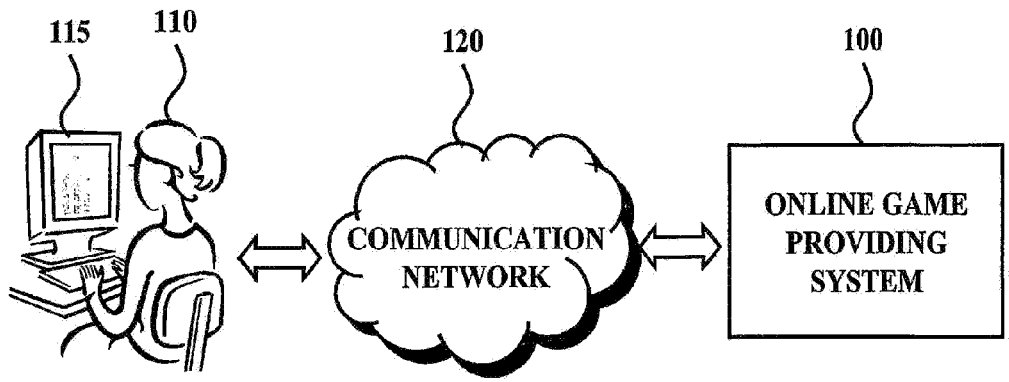
FIG. 1 is a network configuration diagram for explaining the schematic operations of an online game providing system according to the present invention.

FIG. 1 is a network configuration diagram for explaining the schematic operations of an online game providing system according to the present invention.

An online game providing system 100 is connected to a terminal 115 of a gamer 110 and a communication network 120, and serves to provide game service to the gamer 110 via the online. In case that the gamer 110 who has installed a game-related program in the terminal 125 accesses the online game providing system 100, the game service may be provided through the game-related program run by game data or game patch transmitted to the terminal 125 by the online game providing system 100. The gamer 110 continues a game by using a player character controlled by the gamer 110 in the game environment.

The gamer 110 may be an internet user who has the terminal 115 to access the communication network 120 and receives predetermined game service by receiving game data or game patch to continue a game from the online game providing system 100 with which the gamer 110 is making a predetermined contract. Also, the gamer 110 controls motions of a player character to continue a game, and receives a monster band from the online game providing system 100 according to the motions of the player character.

The terminal 115 is a device that maintains a connection state with the online game providing system 100 through the communication network 120, such as the Internet and a telephone line, and embodies an online game while receiving data necessary to play a game from the online game providing system 100. That is, the terminal 125 is a general concept of terminals having computation capacity by mounting a predetermined memory unit and a micro processor, for example, a desktop personal computer, a notebook personal computer, a PDA (Personal Digital Assistant), a mobile communication terminal, and the like, and capable of accessing wired/wireless communication network.

Figure 2:
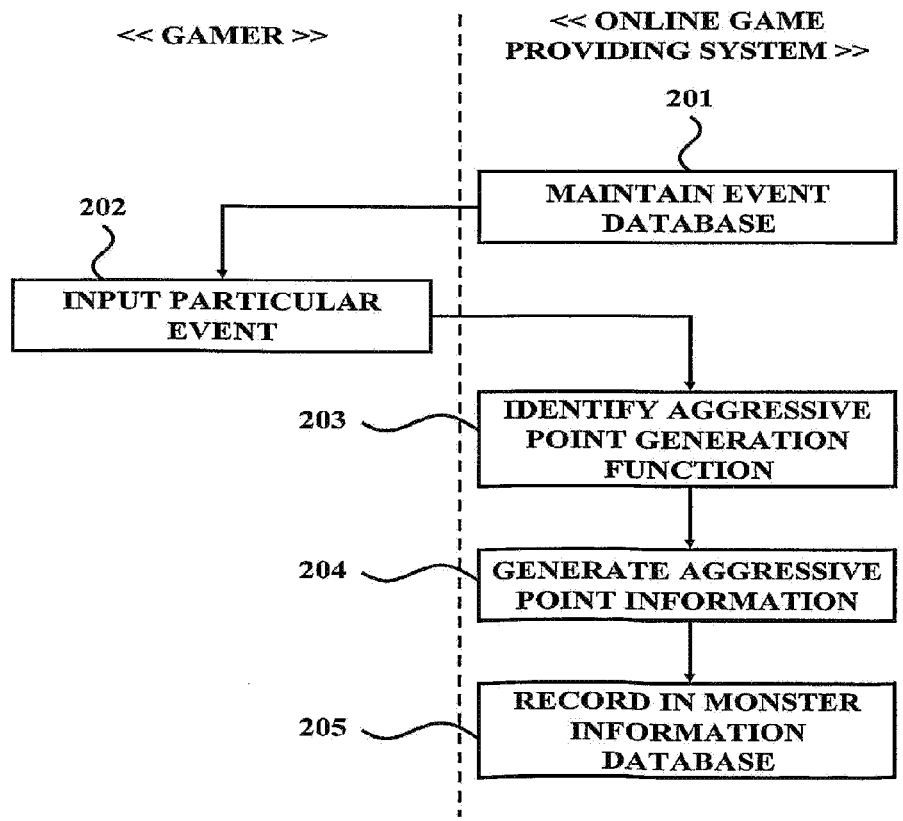
FIG. 2 is a flowchart illustrating the process of generating aggressive point information and recording in a monster information database, in an online game providing method according to an embodiment of the present invention.

FIG. 2 is a flowchart illustrating the process of generating aggressive point information and recording in a monster information database, in an online game providing method according to an embodiment of the present invention. The online game providing method according to the present invention is provided at a predetermined online game providing system.

In step 201, the online game providing system maintains an event database recording an aggressive point generation function corresponding to each predetermined event.

An event may include various types of acts received from a player character in accordance with inputting of a gamer in association with progress of an online game. Or, the event may include all changes and incidents in a game, satisfying a pre-set standard irrespective of a player character.

According to an embodiment of the present invention, there is provided a method for providing an online game, in which the event includes at least one of an attack trial event, an attack success event, a debuff trial event, and a debuff success event against the monster.

The attack trial event implies that a player character tries to cause damage to a monster through attack against the monster, the attack success event implies that a player character caused damage to a monster through attack against the monster, the debuff trial event implies that a player character tries to put a spell on a monster to weaken its ability, and the debuff success event implies that a player character put a spell on a monster to weaken its ability.

According to the present embodiment, certain aggressive point information about a player character is given, not only in case that the player character succeeds in attacking a monster, but also in case that the player character tries to attack. Also, debuff trial or debuff success of a player character against a monster is used as an element of aggressive point information. That is, since aggressive point information is generated through various acts of a player character, interests on a game get more and aggressive point information formed of a more reasonable numerical value may be generated.

Also, according to another embodiment of the present invention, the event may include a heal event or a buff event for another player character.

The heal event implies that a first player character cures a second player character, and the buff event implies that a first player character strengthens the ability of a second player character. Preferably, a monster that becomes to have aggressive point information with respect to the first player character by the heal event or the buff event may have aggressive point information with respect to the second player character before the heal event or buff event occurs. That is, in case that another player character cures a player character about which a monster has aggressive point information, or strengthens its ability, the monster becomes to have aggressive point information even with respect to the another player character.

According to the present embodiment, although a gamer does not input a direct act against a monster through his/her player character, in case that another player character about which the monster already has aggressive point information is cured or its ability is strengthened, certain aggressive point information with respect to the player character is given to the monster, interests of a game get more, and aggressive point information formed of a more reasonable numerical value may be generated.

Also, according to another embodiment of the present invention, the event may include an approach event within the predetermined distance of the visual field associated with a monster, or an attack success event against a player character from the monster.

In the approach event, it is regarded that a gamer may highly possibly attack a monster in case that the gamer approaches within the certain distance from the monster, although the gamer does not input an aggressive act against the monster through his/her player character. The attack success event from a monster has a meaning as a means to continue an attack although a player character does not react to the monster's attack.

As described above, according to the present invention, since various events in a game are involved in generating aggressive point information, the aggressive point information may be updated in real time, even while the game in progress. Further, since a target for attack of a monster is not fixed to one player character, but changed by a certain standard, there is an effect that the roundup of mobs is significantly prevented and interests of a game get more.

FIG. 3 is a view illustrating an example of an event database according to the present invention. In FIG. 3, an event identifier 301 is used to identify each event. One event corresponds to an event identifier, an aggressive point generation function, and a channel, and for example, a drawing symbol 302 shows that an "attack success" event corresponds to an identifier, "P2M_Damage", an aggressive point generation function, "Function B", and a channel, "Third channel".

Like above, an aggressive point generation function corresponding to each event is recorded in an event database, and the aggressive point generation function may be pre-set by a game developer or a game provider providing an online game to meet the characteristics of each event.

Previously, it has been described about an embodiment in which the event includes an attack trial event, an attack success event, a debuff trial event, or a debuff success event against a monster. In the present embodiment, the aggressive point generation function may take a decrease rate of HP (Hit Point) of a monster according to receipt of the each event as at least one variable. The decrease rate of HP of a monster according to receipt of each event may be differential, and even in case of receiving the same type of events, a decrease degree of HP of the monster may be differential. Accordingly, a numerical value of aggressive point information may be different in accordance with the intensity of an event as well as the type thereof.

Also, previously, it has been described about an embodiment in which the event includes a heal event or buff event for another player character. In the present embodiment, the aggressive point generation function may take an increase rate of HP of said another player character as at least one variable. Or, the aggressive point generation point may take the level difference between a player character and a monster, the attribute of a monster, or an occupation of a player character as additional variable.

In step 202, the online game providing system according to the present invention receives a particular event from a player character or a gamer. The particular event may be at least one of the aforementioned events.

In step 203, the online game providing system identifies an aggressive point generation function corresponding to the particular event by referring to an event database. In step 204, the online game providing system generates aggressive point information according to receipt of the particular event on the basis of the identified aggressive point generation function. For example, referring to the drawing symbol 302, in case that the online game providing system receives an "attack success" event from a player character, the online game providing system may identify an aggressive point generation function, "Function B", corresponding to the "attack success" event, and generate aggressive point information according to receipt of the "attack success" event in accordance with an aggressive point generation function, "Function B".

In step 205, the online game providing system records the generated aggressive point information in a predetermined monster information database in association with the player character. FIG. 4 is a view illustrating an example of the monster information database.

Referring to FIG. 4, a monster of which a monster identifier is "M_id 0001" has aggressive point information with respect to a plurality of player characters including "suezo", "windy", etc. A monster of which a monster identifier is "M-id 0002" has aggressive point information with respect to a plurality of player characters including "karma", "cluster", etc.

According to an embodiment of the present invention, there is provided a method for providing an online game, in which the monster information database comprises at least one channel, an aggressive point is recorded in the channel for the each channel, and the aggressive point information is the total of aggressive points recorded in the each channel.

FIG. 4 illustrates an example of the monster information database comprising a first, a second, and a third channels according to the present embodiment. Referring to FIG. 4, the monster having the monster identifier "M_id 0001" records a first aggressive point, "50", in the first channel, a second aggressive point, "25", in the second channel, and a third aggressive point, "100", in the third channel, respectively, and records the total of the first, the second, and the third aggressive points, "175", as aggressive point information. Like above, if aggressive point information is maintained in the monster information database for each channel, it is possible to manage the aggressive point information more organically since the aggressive points change according to time on the basis of the peculiar characteristic of each channel.

According to an embodiment of the present invention, there is provided a method for providing an online game, in which a first aggressive point recorded in a first channel decreases in accordance with a first decreasing function of time, a second aggressive point recorded in a second channel decreases in accordance with a second decreasing function of time, and a third aggressive point recorded in a third channel is maintained to be regular, and a decrease rate of the first decreasing function is larger than that of the second decreasing function. The first decreasing function or the second decreasing function may change by a predetermined standard associated with progress of the online game.

In the present embodiment, a first channel is a channel where an aggressive point decreases fastest by time, a second channel is a channel where an aggressive point decreases slowly by time in comparison with the first channel, and a third channel is a channel where an aggressive point is maintained to be regular by time without decreasing.

In the meantime, according to an embodiment of the present invention, there is provided a method for providing an online game in which each event is recorded in an event database in association with the each channel. FIG. 3 illustrates an example of the event database recording each event in association with each channel.

According to the present invention, aggressive point information generated according to receipt of each event may decrease fast or slowly, or may be maintained to be regular without decreasing by connecting each event to each channel on the basis of the degree of decreasing an ability point of a monster. For example, if "A" event decreases an ability point of a monster by "10", "B" event decreases the ability point of the monster by "50", and "C" event decreases the ability point of the monster by "100", the "A" event may be connected to the first channel, the "B" event connected to the second channel, and the "C" event connected to the third channel. That is, in case of an event causing huge damage to a monster, the monster may continue to attack a player character by maintaining aggressive point information by the event without decreasing. Also, in case of an event causing comparatively small damage to a monster, aggressive point information may be enabled to disappear by decreasing the aggressive point information fast or slowly according to time on the basis of the degree of the damage.

According to an embodiment of the present invention, there is provided a method for providing an online game in which, among the aforementioned events, the attack trial event and the debuff trial event are associated with the first channel, the heal event and the buff event are associated with the second channel, and the attack success event and the debuff success event are associated with the third channel.

Since the attack trial event and the debuff event cause comparatively small damage to a monster, it causes aggressive point information to decrease fast, and since the heal event and the buff event may cause big damage to a monster rather than the attack trial event and the debuff event, it causes aggressive point information to decrease a little slowly. Also, since the attack success event and the debuff success event may cause critical damage to a monster, aggressive point is maintained without decreasing. In this manner, aggressive point information may be maintained more systematically.

Like above, according to the present invention, there is an effect that it is possible to improve gamers' fun about a game by diversifying elements involved in generation of aggressive point information and influence according to each element. Also, according to the present invention, there is another effect that it is possible to enhance interests of a game through maintenance of more systematic aggressive point information by dividing the aggressive point information into various types and making disappearance of aggressive point information and a decrease rate thereof differential in accordance with each type.

Previously, procedures of generating aggressive point information and recording in a monster information database and various embodiments according to the procedures have been described. Hereinafter, an embodiment using the aggressive point information as above will be described.

FIG. 5 is a flowchart illustrating the process of determining a target for attack of a monster on the basis of aggressive point information, in an embodiment of the present invention.

In step 501, the online game providing system recording aggressive point information in a monster information database in association with a player character by performing the steps 201 to 205 extracts aggressive point information associated with a plurality of player characters from the monster information database. In this case, the online game providing system may extract aggressive point information associated with a plurality of player characters approaching within the predetermined distance of the visual field associated with a monster, in performing the step 501.

In step 502, the online game providing system determines a player character of which the extracted aggressive point information is largest among a plurality of the player characters to be a target for attack of a monster.

According to the present embodiment, there is an effect that it is possible to can prevent a roundup of mobs by systematically maintaining aggressive point information with respect to a player character of a monster and selecting a target for attack of the monster on the basis of the aggressive point information.

FIG. 6 is a flowchart illustrating the process of distributing an experience point associated with a monster to a plurality of player characters on the basis of aggressive point information, in another embodiment of the present invention.

In step 601, the online game providing system recording aggressive point information in a monster information database in association with a player character by performing the steps 201 to 205 extracts aggressive point information associated with a plurality of player characters from the monster information database. In this case, the online game providing system may extract aggressive point information associated with a plurality of player characters approaching within the predetermined distance of the visual field associated with a monster, in performing the step 601. Or, the online game providing system may extract aggressive point information associated with a plurality of player characters participating in a final attack associated with the disappearance of a monster.

In step 602, the online game providing system distributes the experience point to a plurality of the player characters according to the ratio of the each aggressive point information for the total of the extracted aggressive point information.

According to the present embodiment like above, there is an effect that it is possible to distribute experience points reasonably enough to satisfy gamers by systematically using aggressive point information with respect to a player character of a monster and fairly distributing experience points associated with the monster to a plurality of player characters on the basis of the aggressive point information.

Figure 7:
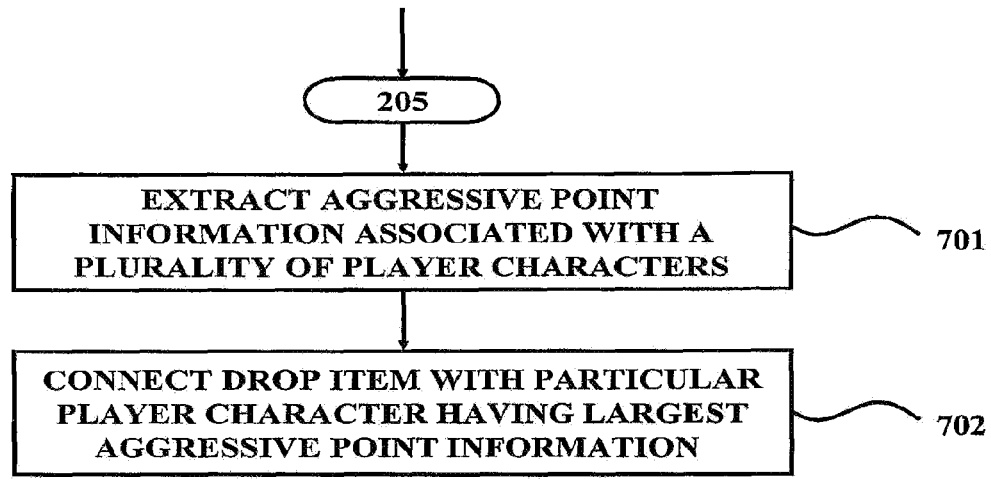
FIG. 7 is a flowchart illustrating the process of connecting a drop item associated with a monster with a particular player character on the basis of aggressive point information, in another embodiment of the present invention.

FIG. 7 is a flowchart illustrating the process of connecting a drop item associated with a monster with a particular player character on the basis of aggressive point information, in another embodiment of the present invention.

In step 701, the online game providing system recording aggressive point information in a monster information database in association with a player character by performing the steps 201 to 205 extracts aggressive point information associated with a plurality of player characters from the monster information database. In this case, the online game providing system may extract aggressive point information associated with a plurality of player characters approaching within the predetermined distance of the visual field associated with a monster, in performing the step 701. Or, the online game providing system may extract aggressive point information associated with a plurality of player characters participating in a final attack associated with the disappearance with a monster.

In step 702, the online game providing system connects the drop item with the particular player character of which the extracted aggressive point information is largest among a plurality of the player characters.

According to the present embodiment, there is an effect that it is possible to solve complications between gamers about possession of a drop item and remove gamers' distrusts about a game company by systematically using aggressive point information with respect to a player character of a monster and having a particular player character possess a drop item associated with the monster on the basis of the aggressive point information.

According to an embodiment of the present invention, in an embodiment distributing the experience point and an embodiment determining possession of a drop item, there is provided a method for providing an online game in which an event received from a player character includes at least one of an initial attack event, a final attack event, an attack success event, and a debuff success event against the monster, and a heal event and a buff event for a second player character.

In this case, the initial attack event may be associated with a channel where an aggressive point decreases in accordance with a predetermined decreasing function of time, and the final attack event, the attack success event, the debuff success event, the heal event, and the buff event may be associated with a channel where an aggressive point is maintained to be regular without decreasing.

According to the present invention, it is possible to improve a gamer's fun about a game by diversifying elements involved in generation of aggressive point information and the influence according to each element. Also, it is possible to distribute an experience point and solve a problem about possession of a drop item in a reasonable manner through the more systematic maintenance of aggressive point information by dividing aggressive point information into various elements and making disappearance of aggressive point information and a decrease rate thereof differential in accordance with each type.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts.

Figure 8:
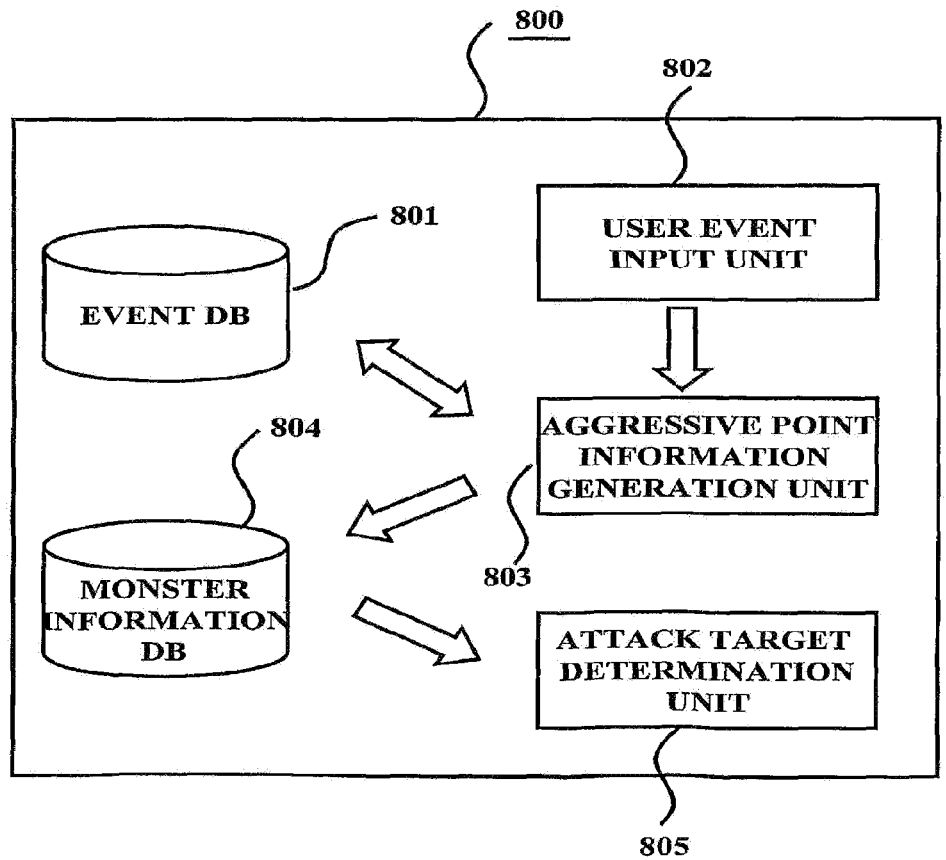
FIG. 8 is a block diagram illustrating an online game providing system according to an embodiment of the present invention.

Hereinafter, an online game providing system according to an embodiment of the present invention will be described. FIG. 8 is a block diagram illustrating the online game providing system according to the present embodiment.

An online game providing system 800 according to the present embodiment comprises an event database 801, a user event input unit 802, an aggressive point information generation unit 803, a monster information database 804, and an attack target determination unit 805.

The event database 801 includes an aggressive point generation function corresponding to each predetermined event. FIG. 3 is a view illustrating an example of the event database 801. Since FIG. 3 has been described in the present specification, detailed description related thereto will be omitted here.

The user event input unit 802 receives a particular event from a player character or a gamer.

The aggressive point information generation unit 803 identifies an aggressive point generation function corresponding to the particular event by referring to the event database 801, and generates aggressive point information according to receipt of the particular event on the basis of the identified aggressive point generation function.

The monster information database 804 records the generated aggressive point information in association with the player character. FIG. 4 is a view illustrating an example of the monster information database 804.

According to an embodiment of the present invention, there is provided the online game providing system 800 in which the monster information database 804 comprises at least one channel, an aggressive point is recorded in the channel for the each channel, and the aggressive point information is the total of aggressive points recorded in the each channel. FIG. 4 illustrates an example of the monster information database 804 comprising a first, a second, and a third channels according to the present invention. Like above, if aggressive point information is maintained in the monster information database 804 for each channel, it is possible to manage the aggressive point information more organically since the aggressive point changes according to time on the basis of the peculiar characteristic of each channel. Since FIG. 4 has been described in the present specification, detailed description related to will be omitted here.

The attack target determination unit 805 determines a target for attack of a monster on the basis of the aggressive point information recorded in the monster information database 804. For this, the attack target determination unit 805 may extract aggressive point information associated with a plurality of player characters from the monster information database 804. At this time, the attack target determination unit 805 may extract aggressive point information associated with a plurality of player characters approaching within the predetermined distance of the visual field associated with a monster.

On the basis of the aggressive point information extracted as above, the attack target determination unit 805 may determine a player character of which the extracted aggressive point information is largest among a plurality of the player characters to be a target for attack of a monster.

According to the present embodiment, there is an effect that it is possible to prevent roundup of mobs by systematically maintaining aggressive point information with respect to a player character of a monster and selecting a target for attack of the monster on the basis of the aggressive point information.

Meanwhile, according to another embodiment of the present invention, the online game providing system 800 may further comprise an experience point distribution unit (not illustrated) distributing an experience point associated with a monster to a plurality of player characters on the basis of the aggressive point information recorded in the monster information database 804, instead of the attack target determination unit 805 or additionally.

In the present embodiment, the experience point distribution unit extracts aggressive point information associated with a plurality of player characters from the monster information database 804. In this case, the experience point distribution unit may extract aggressive point information associated with a plurality of player characters approaching within the predetermined distance of the visual field associated with a monster. Or, the experience point distribution unit may extract aggressive point information associated with a plurality of player characters participating in a final attack associated with the disappearance of a monster.

On the basis of the aggressive point information extracted such above, the experience point distribution unit distributes the experience point to a plurality of the player characters in accordance with the ratio of the each aggressive point information for the total of the extracted aggressive point information.

According to the present embodiment, there is an effect that it is possible to distribute an experience point reasonably enough to satisfy gamers by systematically using aggressive point information with respect to a player character of a monster and fairly distributing an experience point associated with a monster to a plurality of player characters on the basis of the aggressive point information.

Meanwhile, according to another embodiment of the present invention, the online game providing system 800 may further comprise a drop item processing unit (not illustrated) connecting a drop item associated with a monster with a particular player character on the basis of the aggressive point information recorded in the monster information database 804, instead of the attack target determination unit 805 or additionally.

In the present embodiment, the drop item processing unit extracts aggressive point information associated with a plurality of player characters from the monster information database 804. In this case, the drop item processing unit may extract aggressive point information associated with a plurality of player characters approaching within the predetermined distance of the visual field associated with a monster. Or, the drop item processing unit may extract aggressive point information associated with a plurality of player characters participating in a final attack associated with the disappearance of a monster.

On the basis of the aggressive point information extracted such above, the drop item processing unit connects the drop item with a particular character of which the extracted aggressive point information is largest among a plurality of the player characters.

According to the present embodiment, there is an effect that it is possible to solve complications between gamers about possession of a drop item and remove gamers' distrusts about a game company by systematically using aggressive point information with respect to a player character of a monster and having a particular player character possess a drop item associated with the monster on the basis of the aggressive point information.

Figure 9:
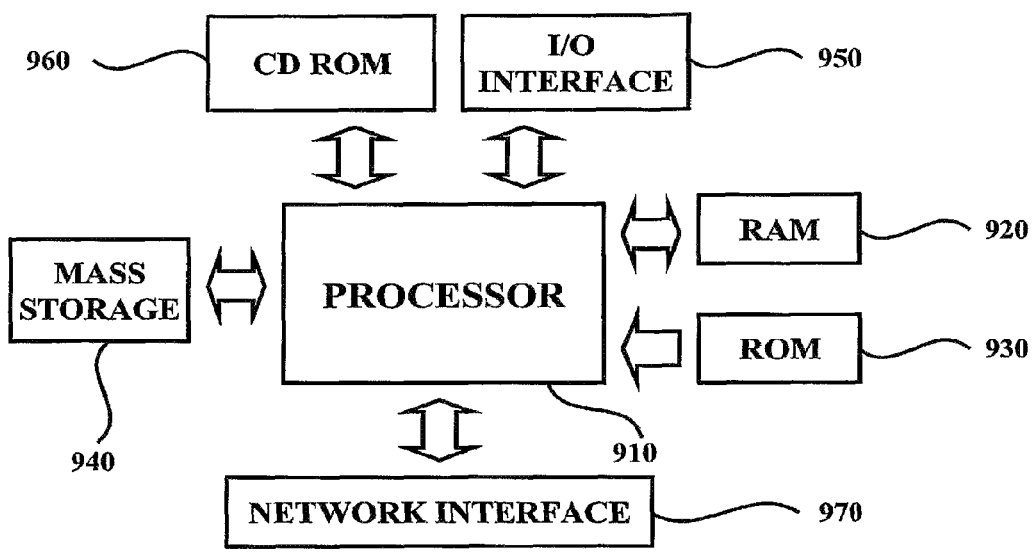
FIG. 9 is an internal block diagram of a general-purpose computer which may be employed in implementing the online game providing method according to the present invention.

FIG. 9 is an internal block diagram of a general-purpose computer which may be employed in implementing the online game providing method according to the present invention.

The computer system 900 includes any number of processors 910 (also referred to as central processing units, or CPUs) that are coupled to storage devices including primary storage (typically a random access memory, or "RAM 920"), primary storage (typically a read only memory, or "ROM 930"). As is well known in the art, ROM 930 acts to transfer data and instructions uni-directionally to the CPU and RAM 920 is used typically to transfer data and instructions in a bi-directional manner. Both of these primary storage devices may include any suitable type of the computer-readable media described above. A mass storage device 940 is also coupled bi-directionally to CPU and provides additional data storage capacity and may include any of the computer-readable media described above. The mass storage device 940 may be used to store programs, data and the like and is typically a secondary storage medium such as a hard disk that is slower than primary storage. A specific mass storage device such as a CD-ROM 960 may also pass data uni-directionally to the CPU. Processor 910 is also coupled to an interface 950 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 910 optionally may be coupled to a computer or telecommunications network using a network connection as shown generally at 970. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

Therefore, it is intended that the scope of the invention be defined by the claims appended thereto and their equivalents.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, objectoriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

According to online game providing method and system of the present invention, there is an effect that it is possible to prevent roundup of mobs by systematically maintaining aggressive point information with respect to a player character of a monster and selecting a target for attack of the monster on the basis of the aggressive point information.

According to online game providing method and system of the present invention, there is an effect that it is possible to distribute experience points reasonably enough to satisfy gamers by systematically using aggressive point information with respect to a player character of a monster and fairly distributing experience points associated with the monster to a plurality of player characters on the basis of the aggressive point information.

According to online game providing method and system of the present invention, there is an effect that it is possible to solve complications between gamers about possession of a drop item and remove gamers' distrusts about a game company by systematically using aggressive point information with respect to a player character of a monster and having a particular player character possess a drop item associated with the monster on the basis of the aggressive point information.

According to online game providing method and system of the present invention, there is an effect that it is possible to improve gamers' fun about a game by diversifying elements involved in generation of aggressive point information and influence according to each element.

According to online game providing method and system of the present invention, there is an effect that it is possible to enhance interests of a game through maintenance of more systematic aggressive point information by dividing the aggressive point information into various types and making disappearance of aggressive point information and a decrease rate thereof differential in accordance with each type.

What is claimed is:

1. A method for providing an online virtual game using a processor, the method comprising:
   receiving, from a user event input unit, one of a plurality of events from a plurality of player characters, each event being specified by an event identifier and each event corresponding to aggressive point generation functions and channels;
   generating, by an aggressive point information generation unit, a plurality of aggressiveness points, each aggressiveness point corresponding to a respective one of the plurality of player characters, the aggressiveness points associated with at least one non-player character and being updated based on each event;
   identifying, by the event identifier, each event from activities of the plurality of player characters against the at least one non-player character;
   calculating, by the processor, the aggressiveness points by accumulating an aggressiveness point subtotal for each channel performed by each activity of each player character, the aggressiveness point subtotal corresponding to the one of the plurality of events;
   recording, by a database, the aggressiveness point subtotal for each channel and the aggressiveness point subtotal for each player character; and
   determining, by an attack target determination unit, a target for the non-player character of the online virtual game to attack using each of the aggressiveness points, wherein the target is one of the plurality of player characters, and each of the aggressiveness points are calculated in real-time in response to a portion of the aggressiveness point subtotals decreasing with lapse of time at a different time lapse rate for each channel.

2. The method of claim 1, further comprising:
   maintaining the database to record the aggressiveness point corresponding to each event, wherein the aggressiveness point is updated according to an aggressiveness point generation function.

3. The method of claim 1, wherein the database comprises a first channel and a second channel, a first aggressiveness point and a second aggressiveness point being recorded in the first channel and the second channel, respectively;
   wherein each of the events is associated with the first channel or the second channel, and the aggressiveness point subtotals are combined to create an aggressiveness point total of the first aggressiveness point and the second aggressiveness point.

4. A method for providing an online game using a processor, the method comprising:
   maintaining a first database coupled to the processor by recording an aggressiveness point generation function corresponding to one of a plurality of events;
   receiving one or more of the plurality of events from a player character against at least one non-player character from the user event input unit, the one or more of the plurality of events being specified by an event identifier and the one or more of the plurality of events corresponding to an aggressiveness generation function and a channel;

calculating by the processor, an aggressiveness point subtotal for each channel by accumulating a plurality of aggressiveness points for each channel performed by the player character, the aggressiveness point subtotal corresponding to the one or more of the plurality of events which is recorded in the first database;

recording, by a second database, the aggressiveness point subtotal for each channel, and the aggressiveness point subtotal for each player character; and determining, by an attack target determination unit, a target for the at least one non-player character to attack using the generated aggressiveness point information, wherein the target is one of the plurality of player characters, and each of the aggressiveness points are calculated in real-time in response to a portion of the aggressiveness point subtotals decreasing with lapse of time at a different time lapse rate for each channel.

5. The method of claim 4, further comprising:
distributing an experience point associated with the at least one non-player character to a plurality of player characters on the basis of the aggressiveness point subtotals recorded in the second database.

6. The method of claim 5, wherein distributing the experience point associated with the at least one non-player character further comprises:
extracting aggressiveness point subtotals associated with a plurality of the player characters from the second database;
distributing, by an experience point distribution unit, the experience point to said plurality of the player characters according to a ratio of the each aggressiveness point subtotals based on a total of the extracted aggressiveness point subtotals.

7. The method of claim 4, further comprising:
providing, by a drop item processing unit, a drop item to each player associated with the at least one non-player character comprising a monster with the player character based on the generated aggressiveness point subtotal recorded in the second database.

8. The method of claim 7, wherein providing the drop item associated with the monster further comprises:
extracting aggressiveness point subtotals associated with the plurality of player characters from the second database; and
connecting, by the processor, the particular player character of which the extracted aggressiveness point subtotals are the greatest among the plurality of player characters with the drop item.

9. The method of claim 4, wherein the event comprises one of an initial attack event, a final attack event, an attack success event, a debuff success event against the at least one non-player character, a heal event, and a buff event for one of the player characters, or any combination thereof.

10. The method of claim 4, wherein the second database comprises a first channel and a second channel;
a first aggressiveness point and a second aggressiveness point being recorded in the first channel and the second channel, respectively;
wherein each of the events is associated with the first channel or the second channel, and the aggressiveness point subtotals are combined to create an aggressiveness point total of the first aggressiveness point and the second aggressiveness point.

11. The method of claim 10, wherein
the first aggressiveness point subtotal decreases in accordance with a predetermined decreasing function of time; and
the second aggressiveness point is maintained to be regular.

12. The method of claim 11, wherein
the event comprises at least one of an initial attack event, a final attack event, an attack success event, a debuff success event against the one or more non player characters, or a heal event, and a buff event for a second player character, and wherein the initial attack event is associated with the first channel; and
one of the final attack events, the attack success event, the debuff success event, the heal event, or the buff event is associated with the second channel.

13. A non-transitory computer readable storage medium comprising an executable program, which when executed, performs the steps of:
maintaining a first database coupled to the processor by recording an aggressiveness point generation function corresponding to one of a plurality of events;
receiving one or more of the plurality of events from a player character against at least one non-player character from the user event input unit, the one or more of the plurality of events being specified by an event identifier and the one or more of the plurality of events corresponding to an aggressiveness generation function and a channel;
calculating by the processor, an aggressiveness point subtotal for each channel by accumulating a plurality of aggressiveness points for each channel performed by the player character, the aggressiveness point subtotal corresponding to the one or more of the plurality of events which is recorded in the first database;
recording, by a second database, the aggressiveness point subtotal for each channel, and the aggressiveness point subtotal for each player character; and
determining, by an attack target determination unit, a target for the at least one non-player character to attack using the generated aggressiveness point information, wherein
the target is one of the plurality of player characters, and each of the aggressiveness points are calculated in real-time in response to a portion of the aggressiveness point subtotals decreasing with lapse of time at a different time lapse rate for each channel.

* * * * *